US012575514B1

(12) United States Patent
Hanson et al.

(10) Patent No.: US 12,575,514 B1
(45) Date of Patent: Mar. 17, 2026

(54) SYSTEM AND METHOD FOR CONTROLLING OSCILLATIONS WITHIN AN IRRIGATION SPAN ASSEMBLY

(71) Applicant: Valmont Industries, Inc., Omaha, NE (US)

(72) Inventors: William Hanson, Ames, NE (US); John Kastl, Wahoo, NE (US)

(73) Assignee: Valmont Industries, Inc., Omaha, NE (US)

( * ) Notice: Subject to any disclaimer, the term of this patent is extended or adjusted under 35 U.S.C. 154(b) by 941 days.

(21) Appl. No.: 17/739,239

(22) Filed: May 9, 2022

Related U.S. Application Data

(60) Provisional application No. 63/190,266, filed on May 19, 2021.

(51) Int. Cl.
A01G 25/09 (2006.01)

(52) U.S. Cl.
CPC .................................. A01G 25/092 (2013.01)

(58) Field of Classification Search
CPC .................................................. A01G 25/092
See application file for complete search history.

(56) References Cited

U.S. PATENT DOCUMENTS

| | | | |
|---|---|---|---|
| 2013/0253752 A1* | 9/2013 | Grabow | A01G 25/092 |
| | | | 701/25 |
| 2018/0184600 A1* | 7/2018 | Charling | A01G 25/167 |
| 2019/0059352 A1* | 2/2019 | Miller | B05B 12/082 |
| 2023/0034874 A1* | 2/2023 | Lee | G01R 23/10 |

* cited by examiner

*Primary Examiner* — Peter D Nolan
*Assistant Examiner* — Mikko Okechukwu Obioha
(74) *Attorney, Agent, or Firm* — Milligan PC LLO

(57) ABSTRACT

The present invention provides a system and method for controlling oscillations within an irrigation span assembly. According to a preferred embodiment, a preferred method may include the steps of: detecting a start/stop event input for a first drive tower within a first time period at a first span location; detecting accelerometer data at the first span location within the first time period; processing accelerometer data to identify any oscillations at the first span location by the first span during the first time period; determining whether a detected oscillation is within a predetermined threshold; and programming a solid state relay timer to add an incremented delay to additional start/stop event inputs.

23 Claims, 8 Drawing Sheets

DETERMINE AVERAGE START-STOP TIMING OF DRIVE TOWER    802

DETERMINE CURRENT FREQUENCY AND DURATION OF START-STOP CYCLE OF DRIVE UNIT    804

MODIFY START-STOP TIMING TO NOT BE A MULTIPLE OF THE NATURAL OR SENSED FREQUENCY OF THE SPAN    806

SYSTEM AND METHOD FOR CONTROLLING OSCILLATIONS WITHIN AN IRRIGATION SPAN ASSEMBLY

RELATED APPLICATIONS

The present application claims priority to U.S. Provisional Application No. 63/190,266 filed May 19, 2021.

BACKGROUND AND FIELD OF THE PRESENT INVENTION

Field of the Present Invention

The present invention relates generally to a system and method for moving irrigation spans. More particularly, the present invention provides a system and method for controlling oscillations within an irrigation span assembly.

Background of the Invention

Modern irrigation systems include interconnected irrigation spans (i.e., spans) and drive towers which support and move the connected spans. The spans in turn support sprinkler systems which spray water (or other applicants) in desired patterns.

Individual spans often extend to lengths 100-200 feet, with overall irrigation machine lengths extending up to 2500-3000 feet. With their large machine lengths, modern irrigation machines are susceptible to changes in span orientation (span roll) due to wind, terrain and other factors. Additionally, the high-center of gravity of an irrigation span relative to its wheelbase can contribute to load transfer (i.e., oscillations and body leaning) between the front and rear of the irrigation machine when velocity is changed. In addition, high winds, particularly steady state winds can cause span rocking due to the vortex shedding effect. Each of these factors, in combination with the start-stop action experienced in most irrigation drive systems (such as via interactions between alignment sensors, microswitches, contactors, motors, drive-lines and tires) can interact with the natural frequency of the spans to cause a positive feedback loop between the span rocking effect and the alignment/drive systems. These interactions can result in strain, damage, and failure of the irrigation structure. In particular, alignment systems and the drive-line components, particularly the final reduction gearboxes (i.e., wheel gearboxes) can experience stress and damage. These issues are compounded when an irrigation machine rapidly and/or repeatedly changes its speed or direction causing oscillations in the connected spans. In these cases, the machine's momentum acts at its center of mass to tilt the spans forward or backward during braking and acceleration. This issue is commonly known as a machine "rocking effect" because it causes the machine to rock back and forth in response to a change of direction or speed. This rocking effect can create significant stress and shearing forces between connected spans.

Fixed delay timers have been used in the past to force a reduction in the drive motor start frequency in order to ensure the maximum alignment/drivetrain start/stop frequency is less than from the natural frequency of the span. Additionally, these and similar devices have been used to interrupt the feedback between the alignment/drive system and the source of the oscillation. However, these fixed timers and other solutions of the prior art have only been helpful in reducing oscillations in limited circumstances. In many cases, these solutions have made oscillation/rocking events worse because they do not address the interplay of stresses and oscillations between spans and they allow high structural stresses to develop. For these reasons, the use of fixed timers has not been widely adopted.

To overcome the limitations of the prior art, a reliable and effective system is needed to control and reduce oscillations within irrigation systems.

SUMMARY OF THE PRESENT INVENTION

To address the shortcomings presented in the prior art, the present invention provides a system and method for controlling oscillations within an irrigation span assembly. According to a preferred embodiment, a preferred method may include the steps of: detecting a start/stop event input for a first drive tower within a first time period at a first span location; detecting accelerometer data at the first span location within the first time period; processing accelerometer data to identify any oscillations at the first span location by the first span during the first time period; determining whether a detected oscillation is within a predetermined threshold; and programming a solid state relay timer to add an incremented delay to additional start/stop event inputs.

According to alternative preferred embodiments, the added timing delay of the present invention may be included in controller timing data transmitted to drive tower control unit.

According to a further preferred embodiment, the system may preferably add a delay to selected start/stop event inputs in selected increments. Additionally, the system of the present invention may adjust the change increments based on the scale of the detected oscillations.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
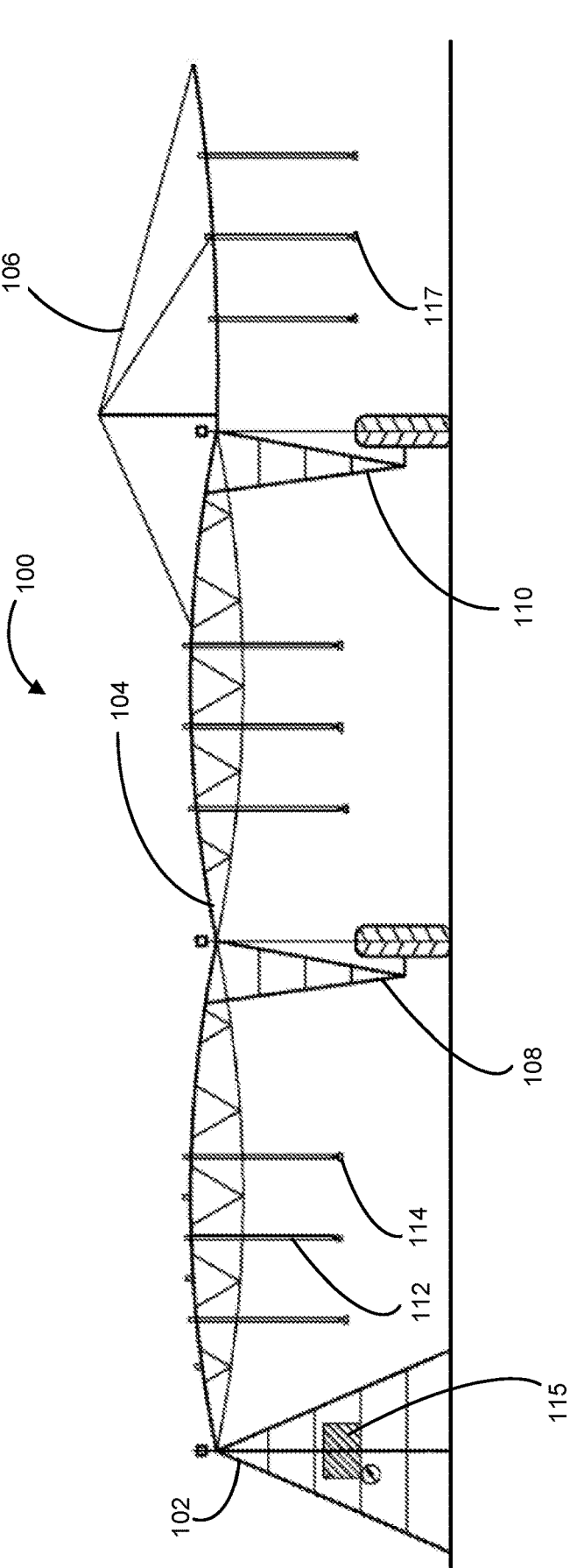
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, it should be understood that the term "drive unit" may preferably include a number of sub-components including: a motor, a controller and a communication device (such as a PLC or the like) While the invention is discussed below with respect to three exemplary towers, the number of towers used may be expanded or reduced (i.e., 2-100 towers) as needed without departing from the spirit of the present invention. Further, the term "motor" as used herein may refer to any suitable motor for providing torque to a drive wheel. Accordingly, the term "motor" as used herein may preferably include motors such as switch reluctance motors, induction motors and the like.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage, or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to'), rather than the mandatory sense (i.e. meaning "must"). Further, it should also be understood that throughout this disclosure, unless logically required to be otherwise, where a process or method is shown or described, the steps of the method may be performed in any order (i.e., repetitively, iteratively or simultaneously) and selected steps may be omitted. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many of the embodiments described herein are described in terms of sequences of actions to be performed by, for example, elements of a controller. It should be recognized by those skilled in the art that the various sequences of actions described herein can be performed by specific circuits (e.g., application specific integrated circuits (ASICs)) and/or by program instructions executed by at least one processor to enable the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter.

The terms "program," "computer program," "software application," "module" and the like as used herein, are defined as a sequence of instructions designed for execution on a computer system. In addition, for each of the embodiments described herein, the corresponding form of any such embodiment may be described herein as, for example, "a computer configured to" perform the described action. Any such computer, program, computer program, module or software application may include a subroutine, a function, a procedure, an object implementation, an executable application, an applet, a servlet, a source code, an object code, a shared library, a dynamic load library and/or other sequence of instructions designed for execution on a computer system. A memory or data storage means, as defined herein, includes many different types of computer readable media including volatile storage such a RAM, buffers, cache memory, and network circuits.

Aspects of the systems and methods described herein may be implemented as functionality programmed into any of a variety of circuitry, including: programmable logic controllers (PLCs), programmable logic devices (PLDs), field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software and the like.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e., fixed systems as well as linear and center pivot self-propelled irrigation systems; stationary systems; corner systems) may be used with the present invention without limitation.

With reference now to FIG. 1, an exemplary irrigation machine 100 of the present invention preferably may include a center pivot structure 102, a main span 104, and supporting drive towers 108, 110. As shown, the main span 104 may preferably support and provide water to a series of sprayers/emitters 112 which may be connected to drop tubes 114 or the like.

The exemplary irrigation machine 100 may also include a corner span (not shown) which may be supported and moved by a steerable drive unit (not shown). The main span 104 (or corner span) may include an extension or boom 106 which may include an end gun (not shown) and/or other sprayers 117. A central control panel 115 is provided for enclosing on-board computer elements such as elements of the exemplary control device 200 discussed below. The control panel 115 may also be linked to a transceiver for transmitting and receiving data between system elements.

Figure 2:
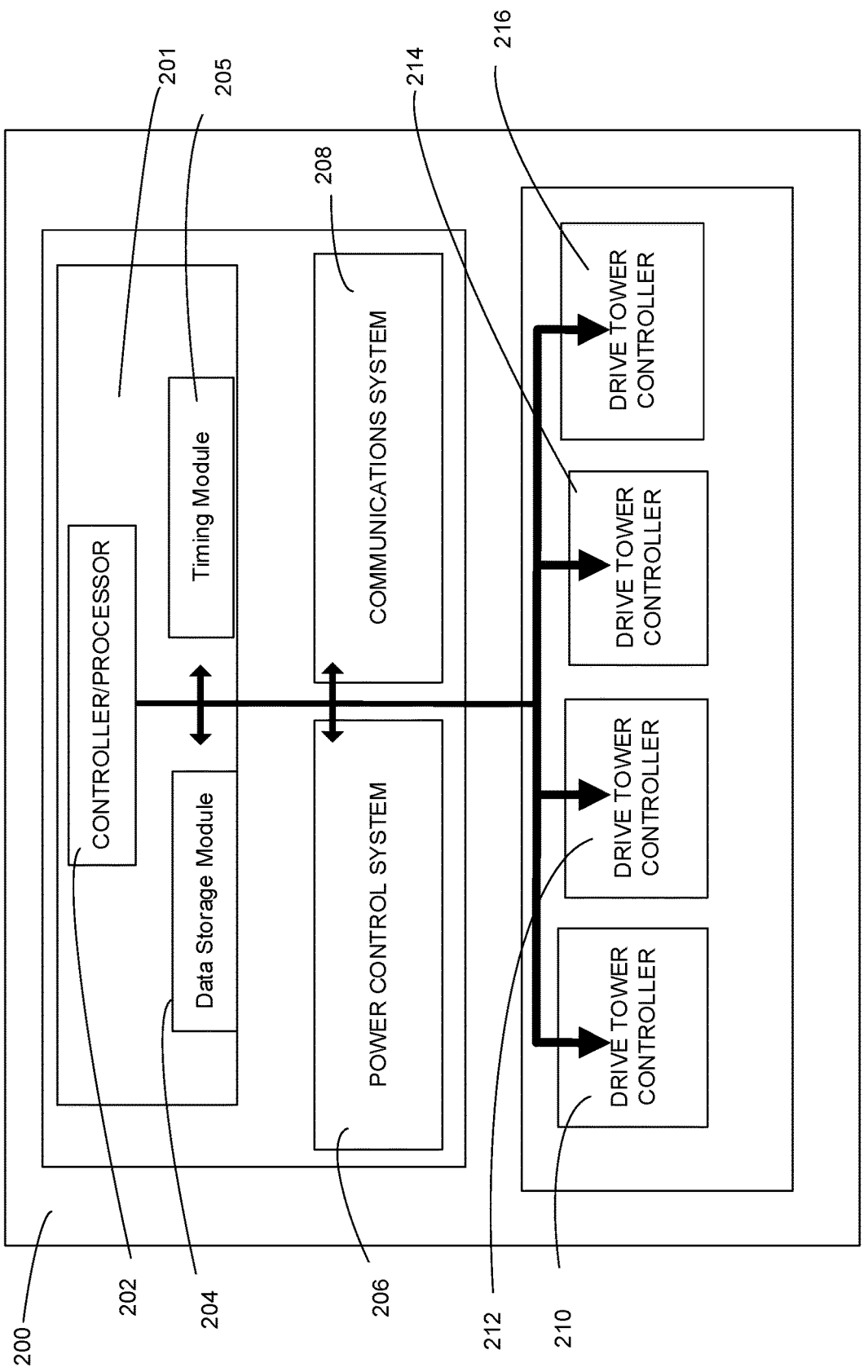
FIG. 2 shows a block diagram illustrating an exemplary processing architecture of a control device in accordance with a first preferred embodiment of the present invention.

With reference now to FIG. 2, an exemplary control device 200 which represents functionality to control one or more operational aspects of the irrigation system 100 will now be discussed. As shown, the exemplary control device 200 includes a control module 201 which further includes a controller 202, a data storage module 204 and a timing module 205. The controller 202 preferably provides processing functionality for the control device 200 and may include any number of processors, micro-controllers, or other processing systems. The controller 202 may execute one or more software programs that implement techniques described herein. The memory/data storage module 204 is an example of tangible computer-readable media that provides storage functionality to store various data associated with the operation of the control device 200, such as the software program and code segments mentioned above, or other data to instruct the controller 202 and other elements of the control device 200 to perform the steps described herein.

In implementations, the exemplary control device 200 preferably further includes a power control system 206 and a communication system 208. These may include conductive transmission lines, circuits and the like for controlling and routing electric power and communication signals, controlling their quality, and controlling the devices attached to the power and communication systems 206, 208 as discussed further below.

Although discussed with respect to a generic wired communication system, the system of the present invention may alternatively use a power line system and/or a wireless network incorporating a variety of wireless components such as wireless access points, transceivers and so forth. The control device 200 may preferably be in communication with each drive tower controller 210, 212, 214, 216 to control movement of the irrigation system 100. Further, the control device 200 may preferably further include multiple inputs and outputs to receive data from sensors and other monitoring devices as discussed further below.

Figure 3:
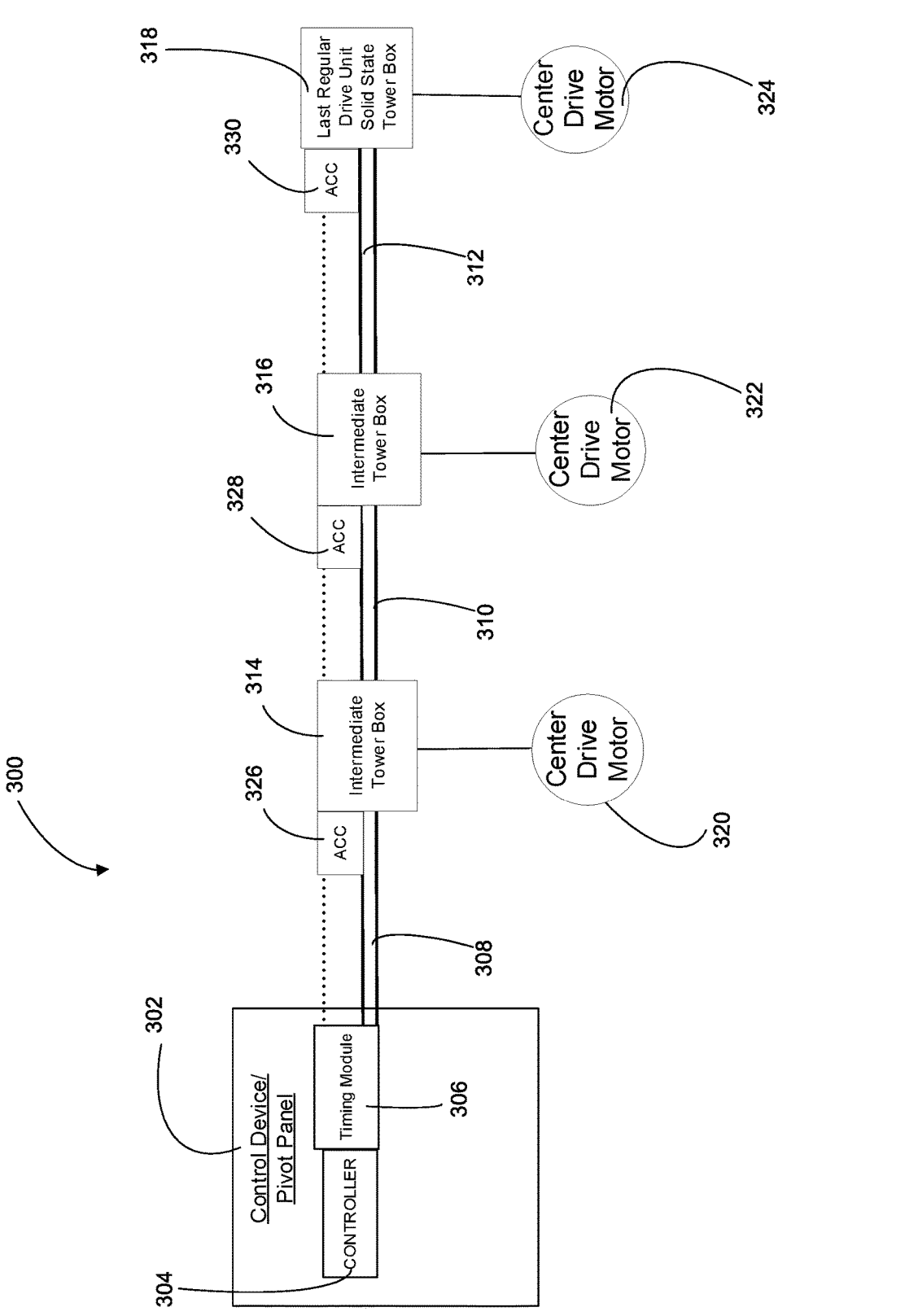
FIG. 3 shows a block diagram of a power and control system in accordance with a further preferred embodiment of the present invention.

With reference now to FIG. 3, further aspects of the present invention shall now be further discussed. As shown in FIG. 3, the power/control systems of the present invention 300 may preferably include a control/pivot panel 302 which preferably provides control signals and power to a series of intermediate tower boxes 314, 316 and a last regular drive unit tower box 318 which control respective drive motors 320, 322, 324. As shown, each tower box 314, 316, 318 preferably further includes one or more accelerometers (ACC) 326, 328, 330. The accelerometers 326, 328, 330 preferably are arranged to detect the direction and scale of motion for each respective span 308, 310, 312. According to a preferred embodiments, other types of vibration and oscillation detectors may alternatively be used without limitation.

According to a preferred embodiment, the control/pivot panel 302 may provide specific control signals (i.e., oscillation control signals) to only the last regular drive unit (LRDU) 318, while allowing all intermediate drive towers to operate as needed to maintain alignment relative to adjacent spans. According to this preferred embodiment, the span alignment control may be made local to each drive unit with little or no communication occurring between drive units (e.g., limited to sharing alignment data sensed by the local alignment arm or the like).

The controller 304 may in some embodiments (directly or indirectly) control and direct the movement of each downstream tower box 314, 316, 318. According to a preferred embodiment, the controller 304 may communicate with each tower box 314, 316, 318 via wireless or wired communications (e.g., power-line carrier via a serial communication connection or the like). As further shown, the controller 304 may be connected to or integrated with a timing module 306 which may operate to delay, adjust or time shift power delivery and/or control signals provided to each tower box 314, 316, 318 as discussed further below. The delaying/time shifting of control signals may be performed via software or hardware. For example, the time shifting may be performed via software within the controller software/firmware. According to a preferred embodiment, the delay/time shifting may be executed by a timing module 306 which may include a programmable solid state timer relay (SSR timer) or the like. Alternatively, the timing module functions may be performed by a programmable logic controller (PLC) or another timing relay device.

According to preferred embodiments, the timing module 306 may preferably operate with the power control system 206 (shown in FIG. 2) to delay/control the flow of current to each respective drive motor 320, 322, 324. Although shown within the pivot panel 302, the location and functions of the timing module 306 may be distributed to each respective tower box 314, 316, 318 or to another location within the irrigation system.

Figure 4:
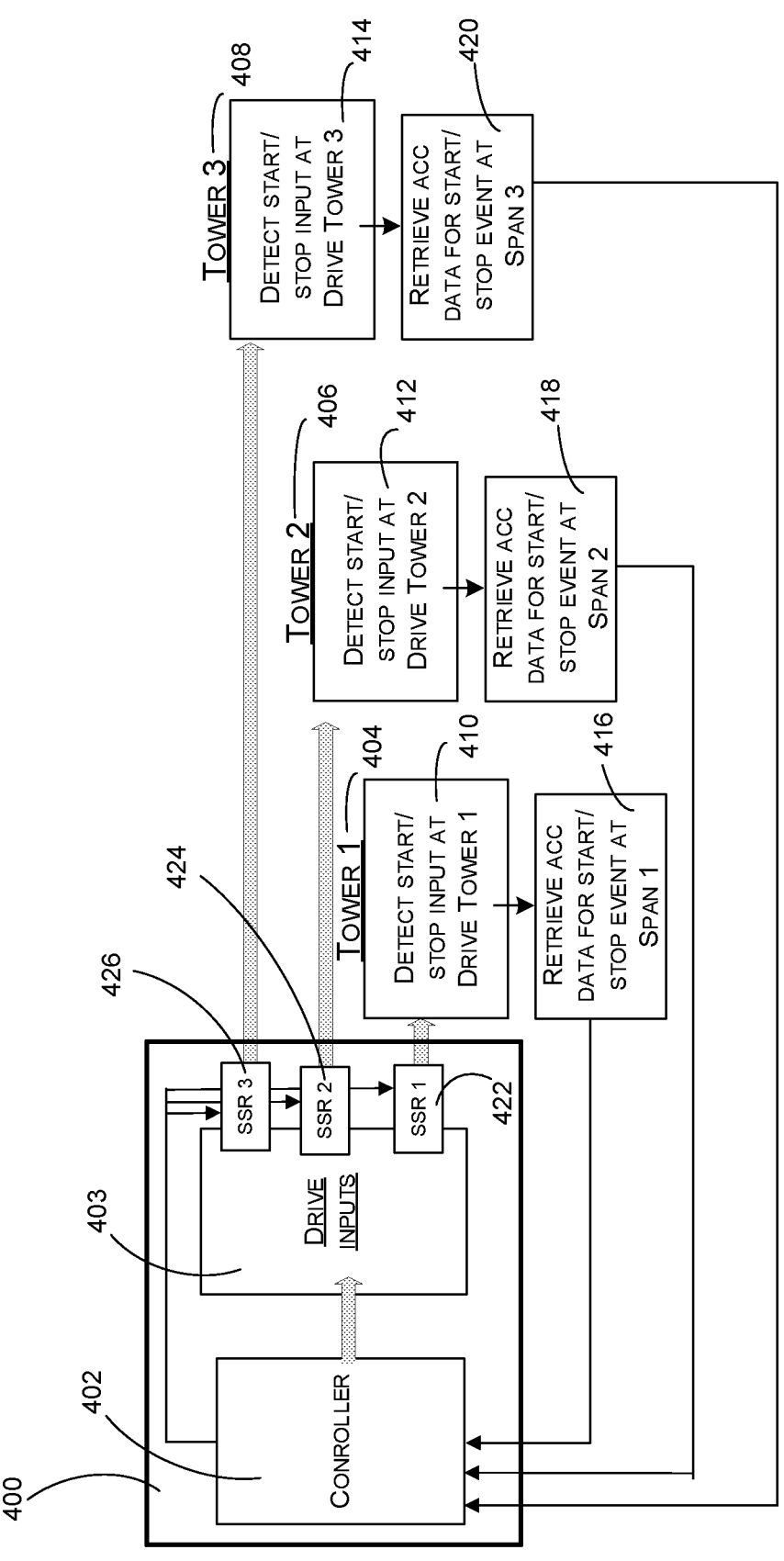
FIG. 4 shows a block diagram illustrating aspects of a timing control system in accordance with a preferred embodiment of the present invention.
Figure 5:
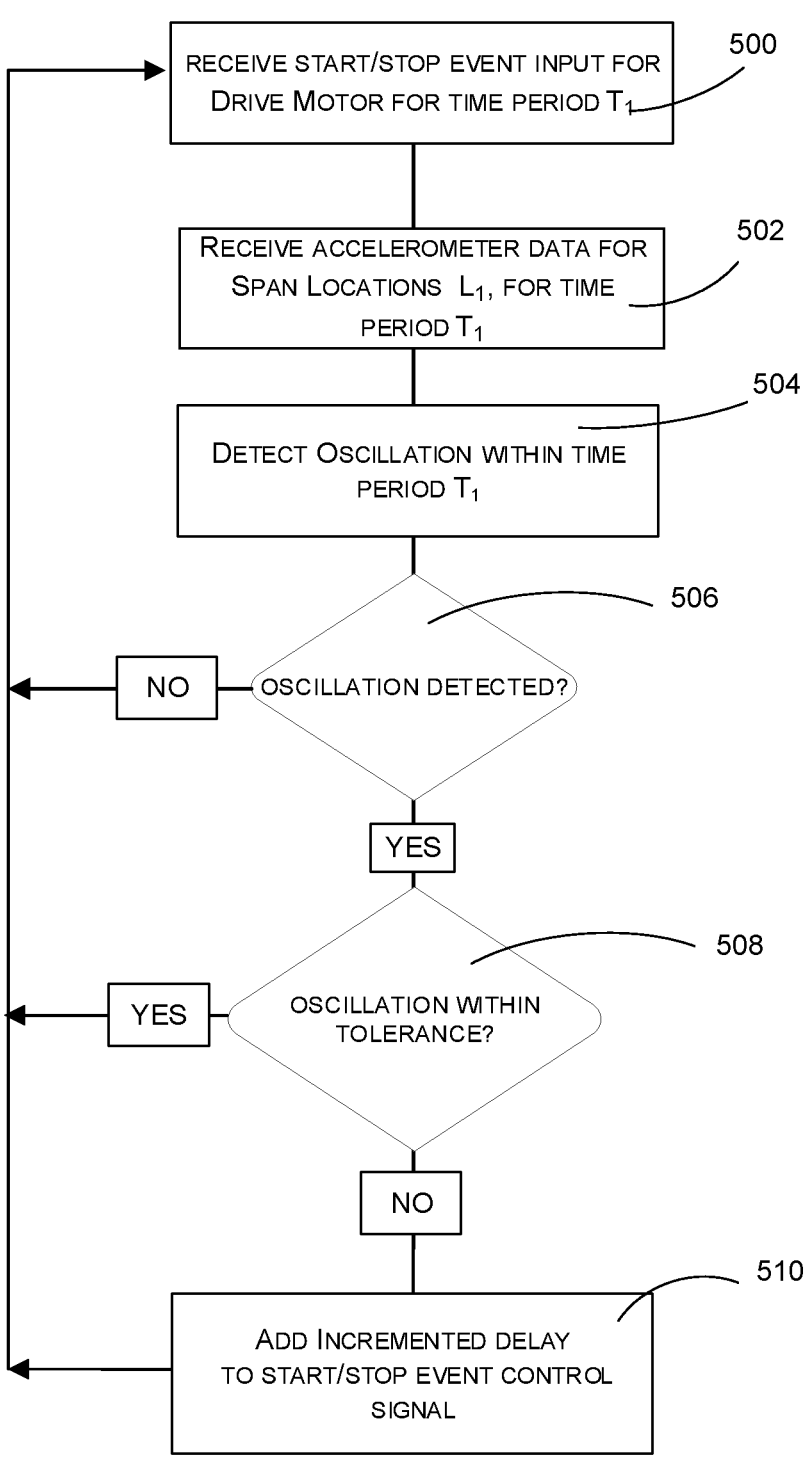
FIG. 5 shows a flow chart illustrating a first method in accordance with aspects of the present invention.

With reference now to FIGS. 4-5, an exemplary system and method of the present invention shall now be discussed. With reference to FIG. 4, a control panel 400 is shown including a controller 402 and one or more timer circuits 422, 424, 426 (e.g., SSR timers). As discussed above, the controller 402 may preferably control one or more drive inputs 403 (i.e., power, current, drive instructions etc.) for a group of drive towers 404, 406, 408. As shown, at a first set of steps 410, 412, 414, the system first detects drive inputs for each drive tower 404, 406, 408, which initiate a change of direction or speed (i.e., a start/stop event). At a next set of steps 416, 418, 420, the system controller 402 preferably then receives accelerometer data from each nearby span for a selected time period before and after the start/stop event The controller 400 may then preferably determine a target time interval to delay the power delivery to each given drive tower 404, 406, 408 in order to minimize the detected oscillations. Preferably, the target time interval is selected based on the magnitude of oscillations detected in a given span following a start/stop event.

Once the target time interval is calculated for a given tower, the controller then may preferably program each SSR (or other circuit) to thereafter delay drive input signals to each tower by the target time interval to ensure that the system cannot change velocity more frequently or quickly than the natural frequency of the structure. Preferably, the target time interval may be between 0-3 seconds and may be incremented by tenths of a second.

With reference now to FIG. 5, a method for determining a target time interval for each drive tower motor is provided. The exemplary method provided in FIG. 5 may be performed by a central controller. Alternatively, selected steps may be performed by individual tower controllers or other distributed processors within the irrigation system. As shown in FIG. 5, at a first step 500, the system may detect or receive a start/stop input for a given tower for a given time period $T_1$. The start/stop input may be any signal or instruction which may affect the velocity or stability of an adjacent irrigation span. For example, the start/stop event input may be a scheduled change in the speed of an irrigation tower from 3 mph to 5 mph, a change of direction, a deceleration event or the like. At a next step 502, the system may then preferably record and transmit accelerometer data for a given span location ($L_1$) for the given time period ($T_1$). At a next step 504, the system preferably analyzes and processes the accelerometer data to identify any oscillations within the given time period $T_1$.

At step 506, the system next preferably determines whether any oscillation is present. If NO, the system then proceeds to wait for the next start/stop event input. If YES, at a next step 508, the system determines whether the detected oscillation is within a selected tolerance or margin of error. If YES, the system then proceeds to wait for the next start/stop even input. If NO and the detected oscillation is outside of a selected acceptable range, at a next step 510, the system controller may preferably add a timer delay to subsequent start/stop event inputs for the given drive tower.

According to a preferred embodiment, the added delay may be executed by a programmable solid state timer relay (SSR) dedicated to a specific drive tower. Alternatively, the added delay may be included in controller timing data transmitted to each drive tower controller. For example, where an oscillation is detected, the system may add a 1.2 second delay to subsequent transmissions of electrical current to a given drive tower.

According to a preferred embodiment, the system may preferably add a delay to selected start/stop event inputs in selected increments. Preferably, the delay interval may be adjusted by tenth of a second increments. Other increments may also be used. Further, the system may change the change increments based on the scale of the detected oscillations. For example, if a large oscillation is detected in the span, the system may adjust the change interval in 0.5 second increments instead of 0.01 second increments. As shown in FIG. 5, once the delay interval is added, the system may preferably proceed to step 500 and wait for another start/stop event input to determine if further delay adjustments should be made.

According to a preferred embodiment, the method shown in FIG. 5 may preferably be continually run for the LRDU tower/drive unit alone with the main system controller adjusting only start/stop timing of the LRDU. Alternatively, the method may be continually and independently run for each drive tower and its adjacent spans. According to an exemplary alternative algorithm, oscillations may also be calculated and adjusted for using selected groups of towers. In this way, the largest oscillations within a group of towers may be identified and locally adjusted for.

Figure 6:
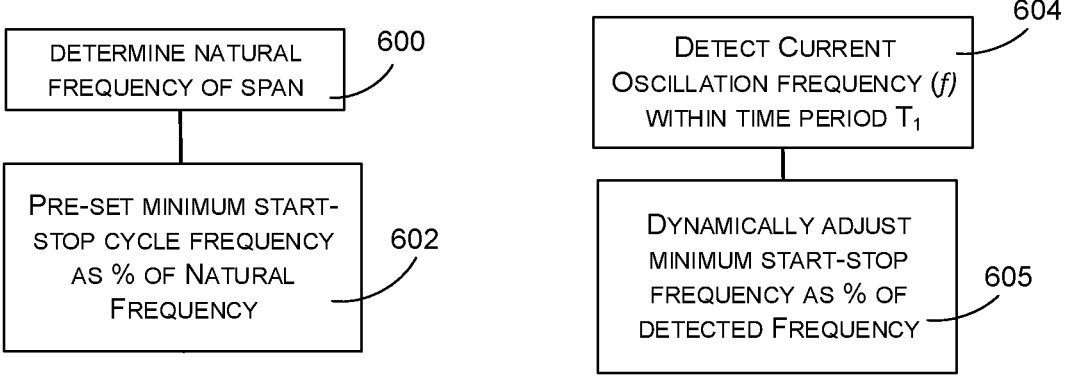
FIG. 6 shows a flow chart illustrating additional method steps in accordance with further aspects of the present invention.
Figure 6:
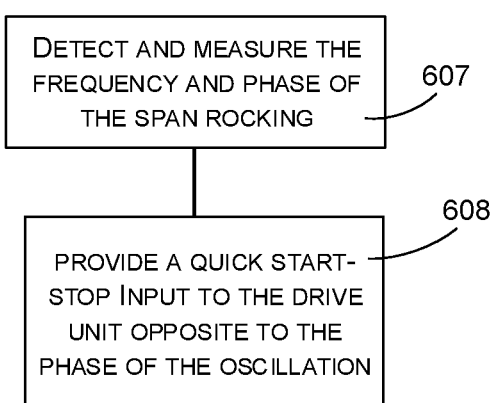
Figure 7:
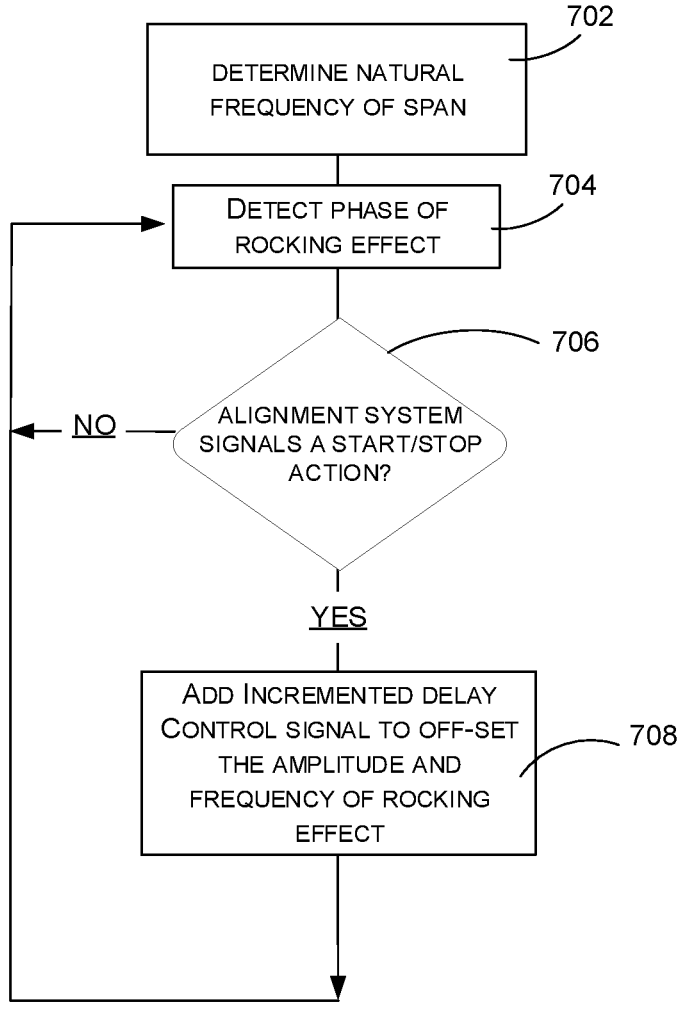
FIG. 7 shows a flow chart illustrating additional method steps in accordance with further aspects of the present invention.
Figure 8:
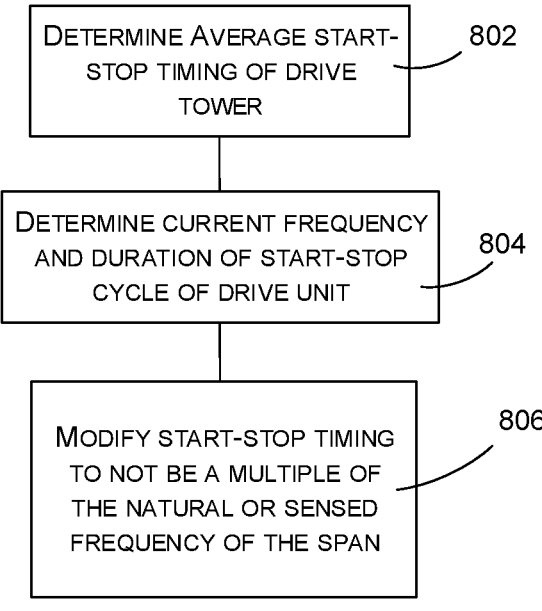
FIG. 8 shows a flow chart illustrating additional method steps in accordance with further aspects of the present invention.

With reference now to FIGS. 6-8, additional alternative embodiments and steps for use with the present invention are shown. As discussed further below, these steps may be used together or independently from each other. Additionally, these steps may be used together or independently from the other steps discussed with reference to FIG. 5 above. Referring now to FIG. 6, at step 600, the present invention may reduce detected oscillations within a given irrigation span by first pre-determining the natural frequency of the span. At step 602, the system may then determine and set a minimum start-stop cycle frequency as a given percentage of the natural frequency (e.g., 10-30%).

According to a further embodiment, as shown in step 604, the system may alternatively or additionally detect/measure the current oscillation frequency of the irrigation system and then (at step 605) dynamically set the minimum start-stop frequency as a percentage of the measured frequency (e.g., 10-30%). Preferably, the measured frequency may be dynamically measured, and the minimum start-stop frequency may be dynamically adjusted in the course of moving the irrigation system. Preferably, the measured frequency may be measured by sensors such as accelerometers, strain gauges or the like.

According to a further embodiment, the system (at step 607) may alternatively or additionally measure the frequency and phase of any detected span rocking and (at step 608) provide a quick start-stop input or "bump" to the drive unit opposite to the phase of the oscillation. Preferably, the system may dynamically measure the frequency and phase of the span rocking and dynamically provide the quick start-stop input to dampen the oscillation and reduce or eliminate the rocking effect.

Referring now to FIG. 7, the active frequency/phase cancelling methods discussed above may preferably be integrated with the normal start-stop operation of the drive system. A preferred method for this integration may include a first step 702 of determining the natural or detected frequency of a given span. At a next step 704, the system may detect the phase of the rocking effect. Thereafter, at a next step 706 the system may detect an alignment system signal to initiate a start/stop action. When this signal is detected, the system at a next step 708 may output an incremented delay control signal to the drive system to delay any drive input signals/action to shift the drive action to cause an out of phase force to be applied to the irrigation span.

Referring now to FIG. 8, another alternative embodiment of the present invention may include a first step 802 of determining the average start-stop timing for a particular tower/drive unit. Preferably, this calculation may be based on the average travel speed of the drive unit. At a next step 804, the system may then determine the current frequency and duration of the start-stop cycle of the drive unit. At a next step 806, the system may then modify the average travel speed of the drive unit so that it is not a multiple of the natural (or sensed) frequency of the span.

Preferably, the determined average travel speed may be determined by calculating a rolling average of start-stop times over a given period of time. Alternatively, the system may use the commanded speed of the LRDU which may be directly or indirectly calculated. According to further preferred embodiments, the status of any detected rocking or responsive adjustments may be transmitted to the pivot panel via any communication system (e.g., power line carrier). In this way, notices may be provided to local or remote operators thus notifying them of the "rocking effect" and the status of the span damping system. According to further preferred embodiments, for constant move systems, a momentary acceleration or deceleration by one or more drive towers may be substituted for (or added in addition to) the inputted timing delays discussed herein.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be duplex or simplex in nature. Further, the systems of the present invention may be used with any arrangement of drive towers including both linear and center pivot systems. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A method for reducing oscillations within an irrigation system having a plurality of connected spans and a plurality of drive towers for moving the connected spans; wherein one or more of the plurality of drive towers comprise a drive motor controller and a drive motor for moving one or more connected spans; the method comprising:

detecting accelerometer data at a first span following an initial start/stop event;

processing the accelerometer data to identify a first oscillation within the first span location during the first time period;

determining whether a degree of the detected first oscillation exceeds a predetermined threshold;

receiving a first set of start/stop input instructions; wherein the first set of start/stop input instructions comprises signals or instructions affecting the velocity or stability of a supported span;

calculating a first target time interval for the first drive tower based at least in part on the detected first oscillation; wherein the first target time interval is calculated to cause the movement of the first span to be at a frequency which destructively interferes with the first detected oscillation;

adding the first target time interval to the first start/stop input data; and transmitting the first start/stop input data to the first drive tower.

2. The method of claim 1, wherein the first target time interval is calculated at least in part based on the first set of start/stop input instructions.

3. The method of claim 2, wherein the drive inputs comprise accelerometer data for the plurality of spans.

4. The method of claim 3, wherein the first target time interval is determined at least in part based on the magnitude of oscillations detected in a given span following the initial start/stop event.

5. The method of claim 4, wherein the first target time interval is determined at least in part based on a detected wind condition.

6. The method of claim 1, wherein the processing of the acceleration data identifies both a first oscillation and second oscillation within the span; wherein the method further comprises the steps of: comparing the first and second oscillation signals; and selecting the oscillation signal with the greater magnitude for calculating the target time interval.

7. The method of claim 6, wherein the method further comprises the step of: transmitting second start/stop input data to a second drive tower.

8. The method of claim 7, wherein the steps are performed by a central controller.

9. The method of claim 8, wherein the method further comprises: calculating and transmitting a second set of start/stop input instructions to a second drive tower.

10. The method of claim 9, wherein the first start/stop event input comprises a scheduled change in the speed of an irrigation tower.

11. The method of claim 10, wherein the first target time interval is added to a first drive signal by a programmable solid state timer relay (SSR) dedicated to the first drive tower.

12. The method of claim 11, wherein the first target time interval is included in controller timing data transmitted to each driver motor controller.

13. The method of claim 12, wherein the first target time interval is added to selected start/stop event inputs in selected increments.

14. The method of claim 13, wherein the first target time interval is calculated in tenth of a second increments.

15. The method of claim 14, further comprising the step of: adjusting the scale of the selectable increments based on the scale of the detected oscillations.

16. The method of claim 12, wherein the steps are continually and independently run for each drive tower and its adjacent spans.

17. The method of claim 16, wherein the oscillations are calculated and adjusted for multiple drive towers.

18. A method for reducing oscillations within an irrigation system having a plurality of connected spans and a plurality of drive towers for moving the connected spans; wherein one or more of the plurality of drive towers comprise a drive motor controller and a drive motor for moving one or more connected spans; the method comprising:

determining the natural frequency of a first span;

detecting accelerometer data at a first span following an initial start/stop event;

processing the accelerometer data to identify a first oscillation within the first span location during the first time period;

determining whether a degree of the detected first oscillation exceeds a predetermined threshold;

receiving a first set of start/stop input instructions; wherein the first set of start/stop input instructions comprises signals or instructions affecting the velocity or stability of a supported span;

setting a minimum start-stop cycle frequency as a given percentage of the natural frequency;

calculating a first target time interval for the first drive tower based at least in part on the detected first oscillation and the detected natural frequency of the span; wherein the first target time interval is calculated to cause the movement of the first span to be at a frequency which destructively interferes with the first detected oscillation;

adding the first target time interval to the first start/stop input data; and transmitting the first start/stop input data to the first drive tower.

19. The method of claim 18, wherein the method further comprises the steps of: detecting the current oscillation frequency of the irrigation system; and dynamically setting a minimum start-stop frequency as a percentage of the detected oscillation frequency.

20. The method of claim 19, wherein the steps are programmed into a first drive controller of the first drive tower.

21. The method of claim 20, wherein the method further comprises: determining the average start-stop timing for the first drive tower.

22. The method of claim 21, wherein the method further comprises the step of: determining the current frequency and duration of the start-stop cycle of the first drive tower.

23. The method of claim 22, wherein the method further comprises:

determining the average travel speed of the first drive tower by calculating a rolling average of start-stop times over a given period of time; and modifying the average travel speed of the first drive unit so that it is not a multiple of the natural or sensed frequency of the first span.

* * * * *